United States Patent
Chiu et al.

(10) Patent No.: US 9,159,490 B2
(45) Date of Patent: Oct. 13, 2015

(54) SOLID ELECTROLYTIC CAPACITOR PACKAGE STRUCTURE AND METHOD OF MANUFACTURING THE SAME, AND CONDUCTIVE UNIT

(71) Applicant: APAQ TECHNOLOGY CO., LTD., Miaoli County (TW)

(72) Inventors: Chi-Hao Chiu, Hsinchu (TW); Ming-Tsung Chen, Changhua County (TW); Kun-Huang Chang, Hsinchu (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 52 days.

(21) Appl. No.: 14/148,915

(22) Filed: Jan. 7, 2014

(65) Prior Publication Data

US 2015/0194262 A1 Jul. 9, 2015

(51) Int. Cl.
  *H01G 2/10* (2006.01)
  *H01G 9/15* (2006.01)
  *H01G 9/00* (2006.01)
  H01G 9/052 (2006.01)

(52) U.S. Cl.
  CPC .............. *H01G 2/10* (2013.01); *H01G 9/0036* (2013.01); *H01G 9/15* (2013.01); *H01G 9/0029* (2013.01); *H01G 9/052* (2013.01); *Y10T 29/417* (2015.01)

(58) Field of Classification Search
  CPC ............. H01G 9/15; H01G 9/04; H01G 9/07; H01G 9/0029; H01G 9/052; H01G 9/0425; H01G 9/012; H01G 9/14; H01G 9/08; C25D 11/26; Y10T 29/417
  USPC .......................................... 361/528, 435, 540
  See application file for complete search history.

(56) References Cited

U.S. PATENT DOCUMENTS

2002/0015277 A1* 2/2002 Nitoh et al. .................... 361/523
2010/0302711 A1* 12/2010 Kaneda et al. ................. 361/524

* cited by examiner

*Primary Examiner* — Kyoung Lee
*Assistant Examiner* — Ratisha Mehta
(74) *Attorney, Agent, or Firm* — Li & Cai Intellectual Property (USA) Office

(57) ABSTRACT

A solid electrolytic capacitor package structure includes a capacitor unit, a package unit and a conductive unit. The package unit includes a package body for enclosing the capacitor unit. The conductive unit includes at least one first conductive terminal and at least one second conductive terminal. The first conductive terminal includes a first core layer and a first enclosing layer. The first core layer has a first top exposed surface exposed from the first enclosing layer, and the first top exposed surface has a first top covering area covered by the package body. The second conductive terminal includes a second core layer and a second enclosing layer. The second core layer has a second top exposed surface exposed from the second enclosing layer, and the second top exposed surface has a second top covering area covered by the package body.

10 Claims, 8 Drawing Sheets

SOLID ELECTROLYTIC CAPACITOR PACKAGE STRUCTURE AND METHOD OF MANUFACTURING THE SAME, AND CONDUCTIVE UNIT

BACKGROUND OF THE INVENTION

1. Field of the Invention

The instant disclosure relates to a solid electrolytic capacitor package structure and a method of manufacturing the same, and a conductive unit, and more particularly to a solid electrolytic capacitor package structure and a method of manufacturing the same, and a conductive unit for increasing the sealing property between a conductive terminal and a package body.

2. Description of Related Art

Various applications of capacitors include home appliances, computer motherboards and peripherals, power supplies, communication products and automobiles. The capacitors such as solid electrolytic capacitors are mainly used to provide filtering, bypassing, rectifying, coupling, blocking or transforming function. Because the solid electrolytic capacitor has the advantages of small size, large electrical capacity and good frequency characteristic, it can be used as a decoupling element in the power circuit of a central processing unit (CPU). In general, a plurality of capacitor elements is stacked together to form a stacked solid electrolytic capacitor with a high electrical capacity. In addition, the stacked solid electrolytic capacitor of the prior art includes a plurality of capacitor elements and a lead frame. Each capacitor element includes an anode part, a cathode part and an insulating part. The insulating part is insulated from the anode part and the cathode part. More specifically, the cathode parts of the capacitor elements are stacked on top of one another.

SUMMARY OF THE INVENTION

One aspect of the instant disclosure relates to a solid electrolytic capacitor package structure and a method of manufacturing the same for increasing the sealing property between a conductive terminal and a package body.

Another one aspect of the instant disclosure relates to a conductive unit for increasing the sealing property between a conductive terminal and a package body.

One of the embodiments of the instant disclosure provides a solid electrolytic capacitor package structure, comprising: a capacitor unit, a package unit and a conductive unit. The capacitor unit includes a plurality of first stacked-type capacitors sequentially stacked on top of one another and electrically connected with each other, wherein each first stacked-type capacitor has a first positive electrode portion and a first negative electrode portion. The package unit includes a package body for enclosing the capacitor unit. The conductive unit includes at least one first conductive terminal and at least one second conductive terminal separated from the at least one first conductive terminal by a predetermined distance, wherein the first stacked-type capacitors are disposed on the top side of the at least one first conductive terminal and the top side of the at least one second conductive terminal, the at least one first conductive terminal has a first embedded portion electrically connected to the first positive electrode portion of the first stacked-type capacitor and enclosed by the package body and a first exposed portion connected with the first embedded portion and exposed from the package body, and the second conductive terminal has a second embedded portion electrically connected to the first negative electrode portion of the first stacked-type capacitor and enclosed by the package body and a second exposed portion connected with the second embedded portion and exposed from the package body. In addition, the at least one first conductive terminal includes a first core layer and a first enclosing layer for enclosing the first core layer, the first core layer has a first exposed top surface exposed from the first enclosing layer and a first exposed bottom surface exposed from the first enclosing layer, the first exposed top surface has a first top covering area covered with the package body and a first top exposed area connected to the first top covering area and exposed from the package body, and the first exposed bottom surface has a first bottom covering area covered with the package body and a first bottom exposed area connected to the first bottom covering area and exposed from the package body. Furthermore, the at least one second conductive terminal includes a second core layer and a second enclosing layer for enclosing the second core layer, the second core layer has a second exposed top surface exposed from the second enclosing layer and a second exposed bottom surface exposed from the second enclosing layer, the second exposed top surface has a second top covering area covered with the package body and a second top exposed area connected to the second top covering area and exposed from the package body, and the second exposed bottom surface has a second bottom covering area covered with the package body and a second bottom exposed area connected to the second bottom covering area and exposed from the package body.

Another one of the embodiments of the instant disclosure provides a conductive unit, comprising: at least one first conductive terminal and at least one second conductive terminal separated from the at least one first conductive terminal by a predetermined distance, wherein the at least one first conductive terminal and the at least one second conductive terminal are connected to a package body. In addition, the at least one first conductive terminal has a first embedded portion electrically connected to the first positive electrode portion of the first stacked-type capacitor and enclosed by the package body and a first exposed portion connected with the first embedded portion and exposed from the package body, and the second conductive terminal has a second embedded portion electrically connected to the first negative electrode portion of the first stacked-type capacitor and enclosed by the package body and a second exposed portion connected with the second embedded portion and exposed from the package body. Moreover, the at least one first conductive terminal includes a first core layer and a first enclosing layer for enclosing the first core layer, the first core layer has a first exposed top surface exposed from the first enclosing layer and a first exposed bottom surface exposed from the first enclosing layer, the first exposed top surface has a first top covering area covered with the package body, and the first exposed bottom surface has a first bottom covering area covered with the package body. Furthermore, the at least one second conductive terminal includes a second core layer and a second enclosing layer for enclosing the second core layer, the second core layer has a second exposed top surface exposed from the second enclosing layer and a second exposed bottom surface exposed from the second enclosing layer, the second exposed top surface has a second top covering area covered with the package body, and the second exposed bottom surface has a second bottom covering area covered with the package body.

Yet another one of the embodiments of the instant disclosure provides a method of manufacturing a solid electrolytic capacitor package structure, comprising: providing at least one first conductive terminal and at least one second conductive terminal; placing a plurality of first stacked-type capacitors on the top side of the at least one first conductive terminal and the top side of the at least one second conductive terminal, wherein the first stacked-type capacitors are sequentially stacked on top of one another and electrically connected with each other, and each first stacked-type capacitor has a first positive electrode portion and a first negative electrode portion; forming a package body to enclose the first stacked-type capacitors, wherein the at least one first conductive terminal has a first embedded portion electrically connected to the first positive electrode portion of the first stacked-type capacitor and enclosed by the package body and a first exposed portion connected with the first embedded portion and exposed from the package body, and the at least one second conductive terminal has a second embedded portion electrically connected to the first negative electrode portion of the first stacked-type capacitor and enclosed by the package body and a second exposed portion connected with the second embedded portion and exposed from the package body; and then bending the first exposed portion and the second exposed portion along an outer surface of the package body. Furthermore, the at least one first conductive terminal includes a first core layer and a first enclosing layer for enclosing the first core layer, the first core layer has a first exposed top surface exposed from the first enclosing layer and a first exposed bottom surface exposed from the first enclosing layer, the first exposed top surface has a first top covering area covered with the package body, and the first exposed bottom surface has a first bottom covering area covered with the package body. In addition, the at least one second conductive terminal includes a second core layer and a second enclosing layer for enclosing the second core layer, the second core layer has a second exposed top surface exposed from the second enclosing layer and a second exposed bottom surface exposed from the second enclosing layer, the second exposed top surface has a second top covering area covered with the package body, and the second exposed bottom surface has a second bottom covering area covered with the package body.

Therefore, the first core layer has a first exposed top surface exposed from the first enclosing layer and a first exposed bottom surface exposed from the first enclosing layer, and the second core layer has a second exposed top surface exposed from the second enclosing layer and a second exposed bottom surface exposed from the second enclosing layer, thus the sealing property between the first conductive terminal and the package body and the sealing property between the second conductive terminal and the package body are increased.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Referring to FIG. 1 to FIG. 6, the first embodiment of the instant disclosure provides a solid electrolytic capacitor package structure Z, comprising: a capacitor unit 1, a package unit 2 and a conductive unit 3.

Figure 1:
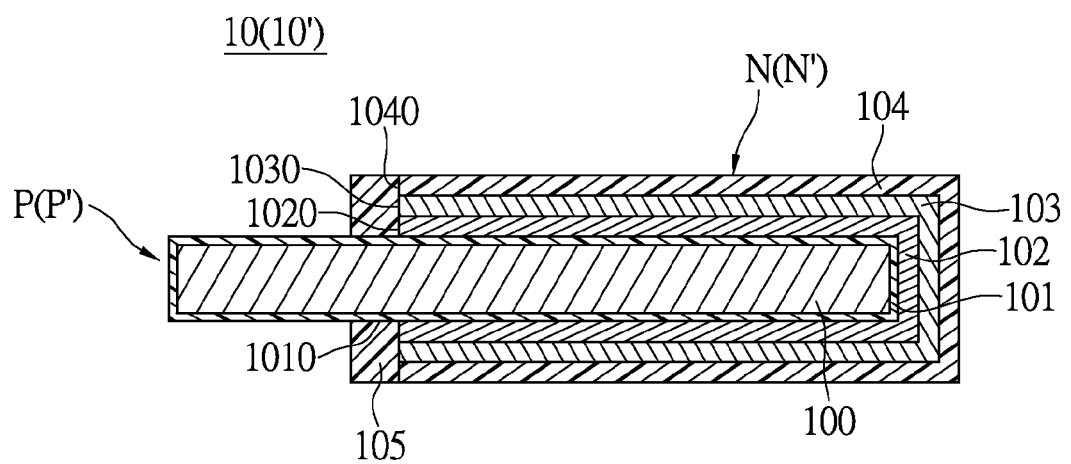
FIG. 1 shows a lateral, cross-sectional, schematic view of the capacitor unit of the solid electrolytic capacitor package structure according to the first and the second embodiments of the instant disclosure.

First, referring to FIG. 1, the capacitor unit 1 is provided with a plurality of first stacked-type capacitors 10 (i.e., a plurality of chip-type capacitors, and only one stacked-type capacitor 10 is shown in FIG. 1), and each first stacked-type capacitor 10 has a first positive portion P and a first negative portion N. For example, each first stacked-type capacitor 10 includes a valve metal foil 100, an oxide insulation layer 101 enclosing the valve metal foil 100, a conductive polymer layer 102 covering one portion of the oxide insulation layer 101, a carbon paste layer 103 enclosing the conductive polymer layer 102, and a silver paste layer 104 enclosing the carbon paste layer 103. In addition, each first stacked-type capacitor 10 has a surrounding insulating layer 105 disposed on the outer surface of the oxide insulation layer 101 and around the outer surface of the oxide insulation layer 101, and the lengths of the conductive polymer layer 102, the carbon paste layer 103 and the silver paste layer 104 of each first stacked-type capacitor 10 are limited by the corresponding surrounding insulating layer 105. For more precisely, the oxide insulation layer 101 has a surrounding region 1010 on the outer surface thereof, and the surrounding insulating layer 105 of each first stacked-type capacitor 10 is surroundingly disposed on the surrounding region 1010 of the corresponding oxide insulation layer 101 and contacting an end 1020 of the corresponding conductive polymer layer 102, an end 1030 of the corresponding carbon paste layer 103 and an end 1040 of the corresponding silver paste layer 104. However, the above-mentioned design for the first stacked-type capacitors 10 of the first embodiment is merely an example and is not meant to limit the instant disclosure.

Figure 2:
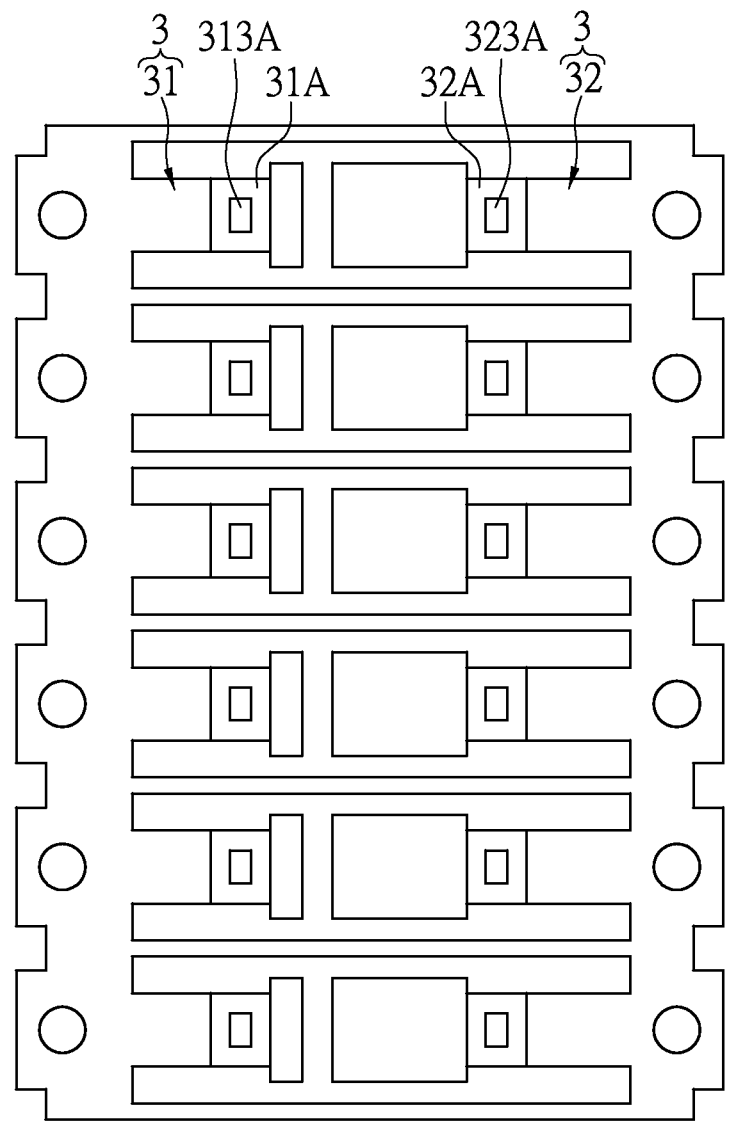
FIG. 2 shows a top, schematic view of the conductive unit of the solid electrolytic capacitor package structure according to the first embodiment of the instant disclosure.
Figure 3:
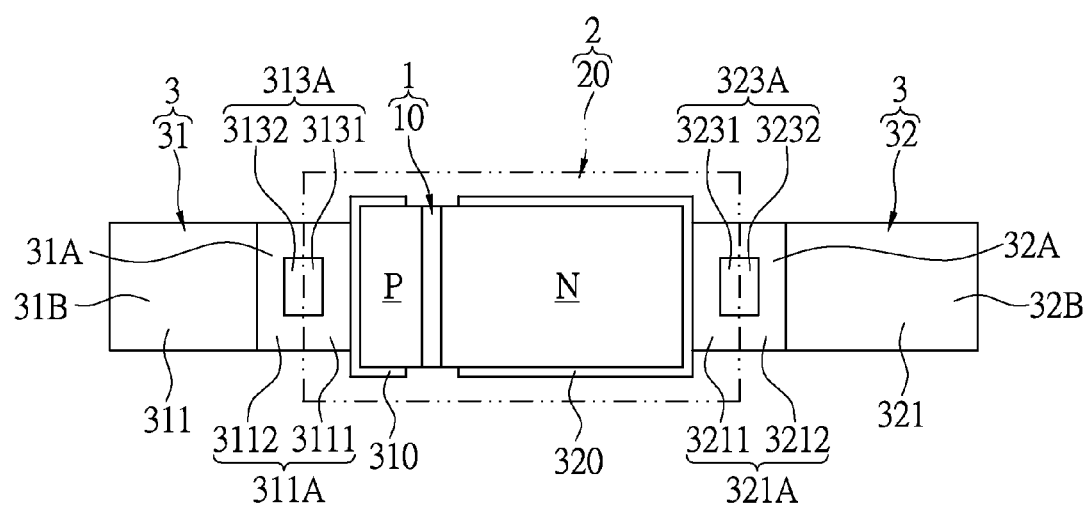
FIG. 3 shows a top, schematic view of the capacitor unit disposed on the conductive unit according to the first embodiment of the instant disclosure.
Figure 4:
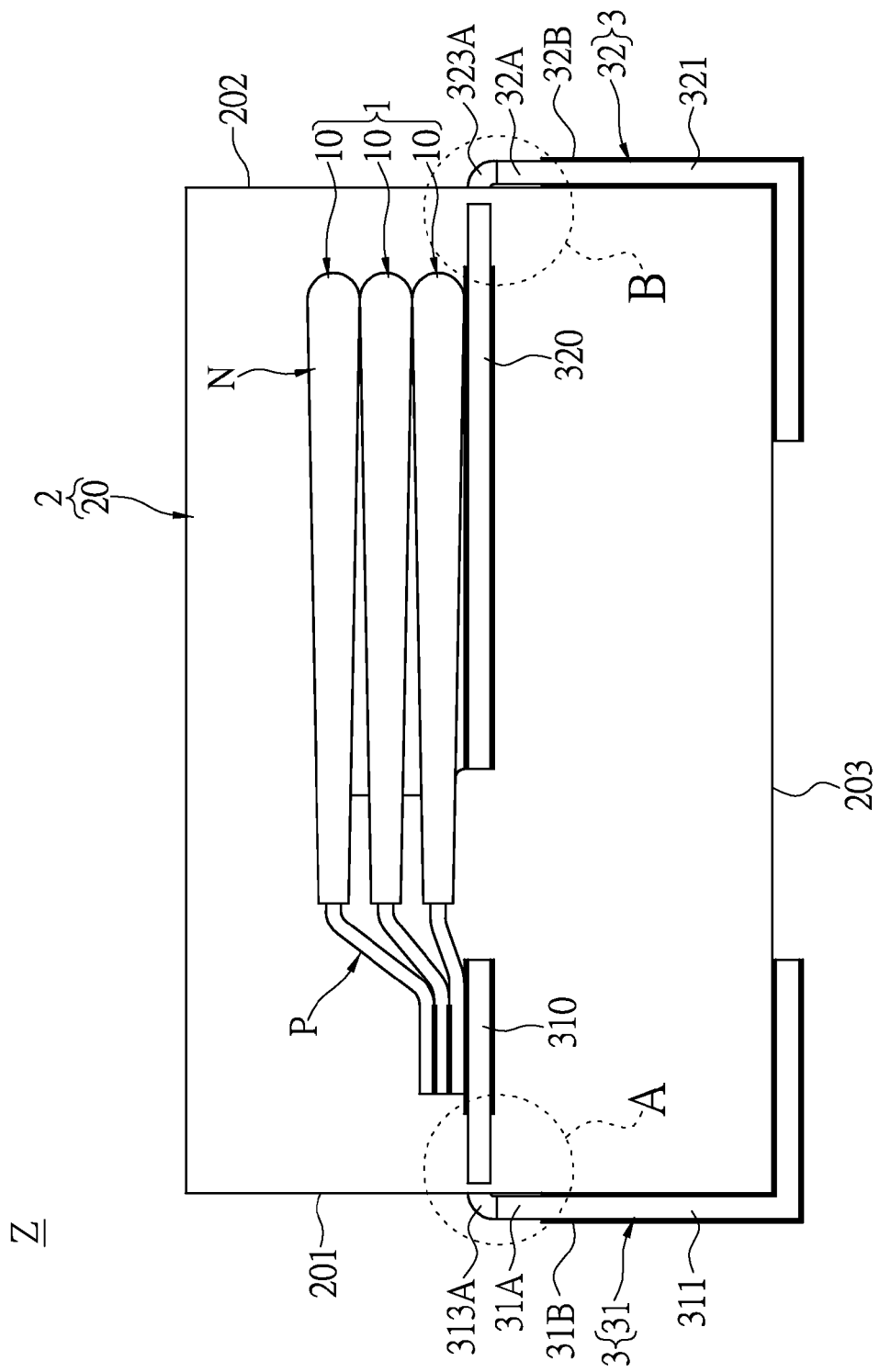
FIG. 4 shows a lateral, schematic view of the solid electrolytic capacitor package structure according to the first embodiment of the instant disclosure.

Moreover, referring to FIG. 2, FIG. 3 and FIG. 4, the first stacked-type capacitors 10 are sequentially stacked on top of one another and electrically connected with each other. The two first negative portions N of the two adjacent first stacked-type capacitors 10 are stacked on top of one another by silver paste (not labeled), and the two first positive portions P of the two adjacent first stacked-type capacitors 10 are stacked on top of one another by a soldering layer (not labeled). In addition, the package unit 2 includes a package body 20 for enclosing the capacitor unit 1, and the package body 20 may be an opaque material such as epoxy or silicone. Furthermore, the conductive unit 3 (i.e., a lead frame) includes a first conductive terminal 31 and a second conductive terminal 32 separated from the first conductive terminal 31 by a predetermined distance. The first conductive terminal 31 has a first embedded portion 310 electrically connected to the first positive electrode portion P of the first stacked-type capacitor 10 (i.e., the first embedded portion 310 electrically contacts the first positive electrode portion P of the bottommost stacked-type capacitor 10) and enclosed by the package body 20 and a first exposed portion 311 connected with the first embedded portion 310 and exposed from the package body 20, and the second conductive terminal 32 has a second embedded portion 320 electrically connected to the first negative electrode portion N of the first stacked-type capacitor 10 (i.e., the second embedded portion 320 electrically contacts the first negative electrode portion N of the bottommost stacked-type capacitor 10) and enclosed by the package body 20 and a second exposed portion 321 connected with the second embedded portion 320 and exposed from the package body 20.

More precisely, referring to FIG. 3 and FIG. 4, the package body 20 has a first lateral surface 201, a second lateral surface 202 opposite to the first lateral surface 201, and a bottom surface 203 connected between the first lateral surface 201 and the second lateral surface 202. In addition, the first exposed portion 311 of the first conductive terminal 31 can be extended along the first lateral surface 201 and the bottom surface 203 of the package body 20 to form a first L-shaped bending pin, and the second exposed portion 321 of the second conductive terminal 32 can be extended along the second lateral surface 202 and the bottom surface 203 of the package body 20 to form a second L-shaped bending pin.

Figure 5:
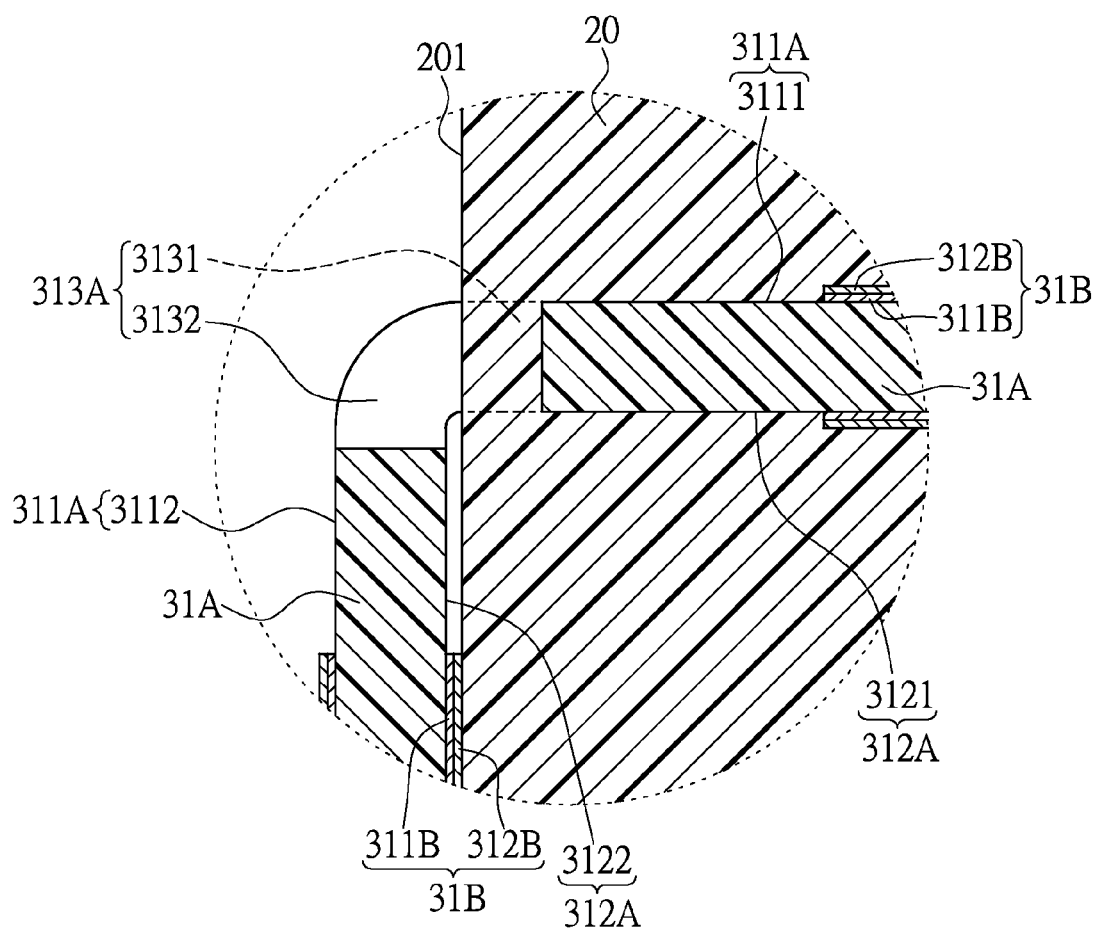
FIG. 5 shows an enlarged view taken on part A of FIG. 4.

Furthermore, referring to FIG. 3, FIG. 4 and FIG. 5, the at least one first conductive terminal 31 includes a first core layer 31A and a first enclosing layer 31B for enclosing the first core layer 31A, and the first core layer 31A has a first exposed top surface 311A exposed from the first enclosing layer 31B and a first exposed bottom surface 312A exposed from the first enclosing layer 31B. In addition, the first exposed top surface 311A has a first top covering area 3111 covered with the package body 20 and a first top exposed area 3112 connected to the first top covering area 3111 and exposed from the package body 20, and the first exposed bottom surface 312A has a first bottom covering area 3121 covered with the package body 20 and a first bottom exposed area 3122 connected to the first bottom covering area 3121 and exposed from the package body 20. More precisely, the first top exposed area 3112 of the first exposed top surface 311A and the first bottom exposed area 3122 of the first exposed bottom surface 312A are connected with the first lateral surface 201 of the package body 20. The first core layer 31A has a first through hole 313A passing through the first core layer 31A and connected to the first exposed top surface 311A and the first exposed bottom surface 312A, and the first through hole 313A has a first filling portion 3131 filled with the package body 20 and a first unoccupied portion 3132 connected with the first filling portion 3131 and exposed from the package body 20. Of course, not only the top and the bottom surfaces (i.e., the first exposed top surface 311A and the first exposed bottom surface 312A) of the first core layer 31A can be exposed from the first enclosing layer 31B, but also two opposite lateral surfaces of the first core layer 31A can be exposed from the first enclosing layer 31B.

For example, the first core layer 31A may be made of Cu (copper) or Cu alloy, the first enclosing layer 31B includes a first connection layer 311B made of Ni (nickel) and a first soldering layer 312B made of Sn (stannum) for enclosing the first connection layer 311B. In addition, the first core layer 31A using Cu or Cu alloy can be exposed from the first enclosing layer 31B by laser engraving, etching, sandblasting or polishing, etc., and the first top covering area 3111 and the first bottom covering area 3121 exposed from the first enclos-ing layer 31B can be extended from the first through hole 313A toward the second conductive terminal 32 by a predetermined distance, but the predetermined distance is merely an example and is not meant to limit the instant disclosure. Because the melting point of Cu or Cu alloy is more than that of Sn, the sealing property between the first core layer 31A of the first conductive terminal 31 and the package body 20 can be increased. It is worth mentioning that one portion of the first enclosing layer 31B is moved by laser engraving, etching, sandblasting or polishing, etc. to form rough surfaces, thus the attachment property between the first conductive terminal 31 and the package body 20 can be increased. In addition, the thickness of the oxide layer generated on surfaces of Cu or Cu alloy can be decreased by adding inert gas during moving one portion of the first enclosing layer 31B, thus the attachment property between the first conductive terminal 31 and the package body 20 can also be increased.

Figure 6:
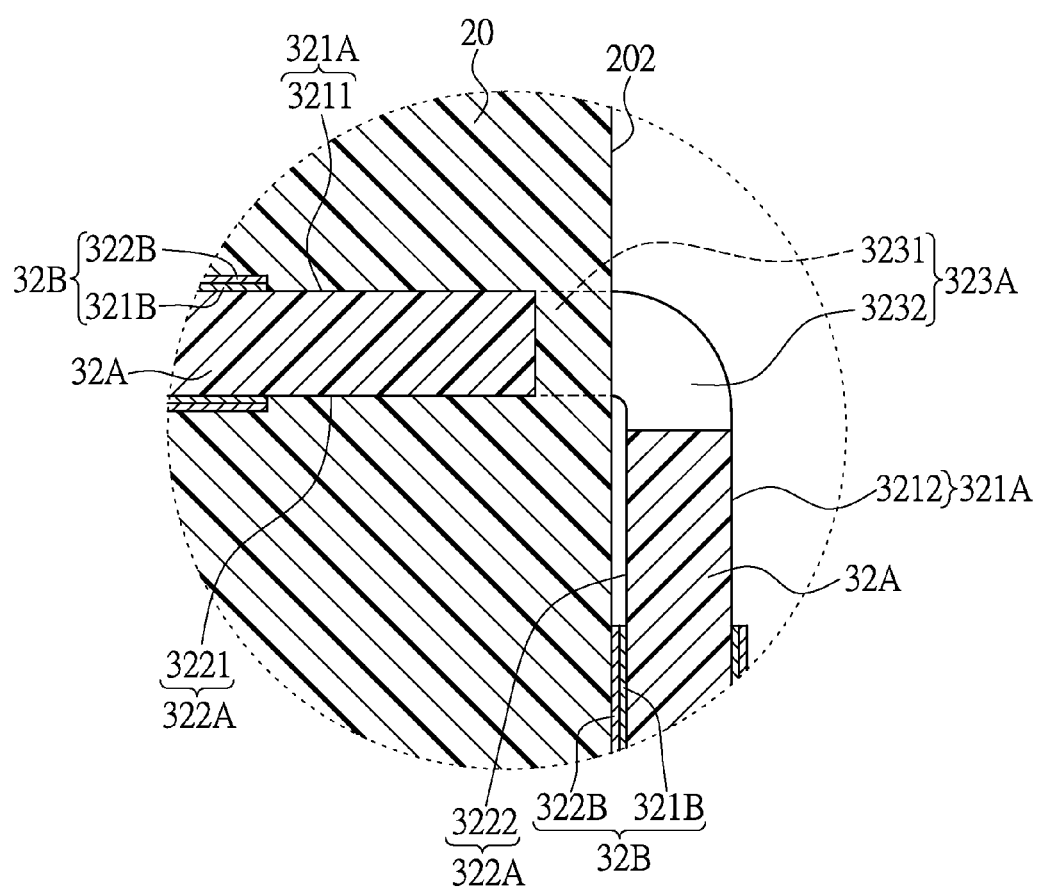
FIG. 6 shows an enlarged view taken on part B of FIG. 4.
Figure 7:
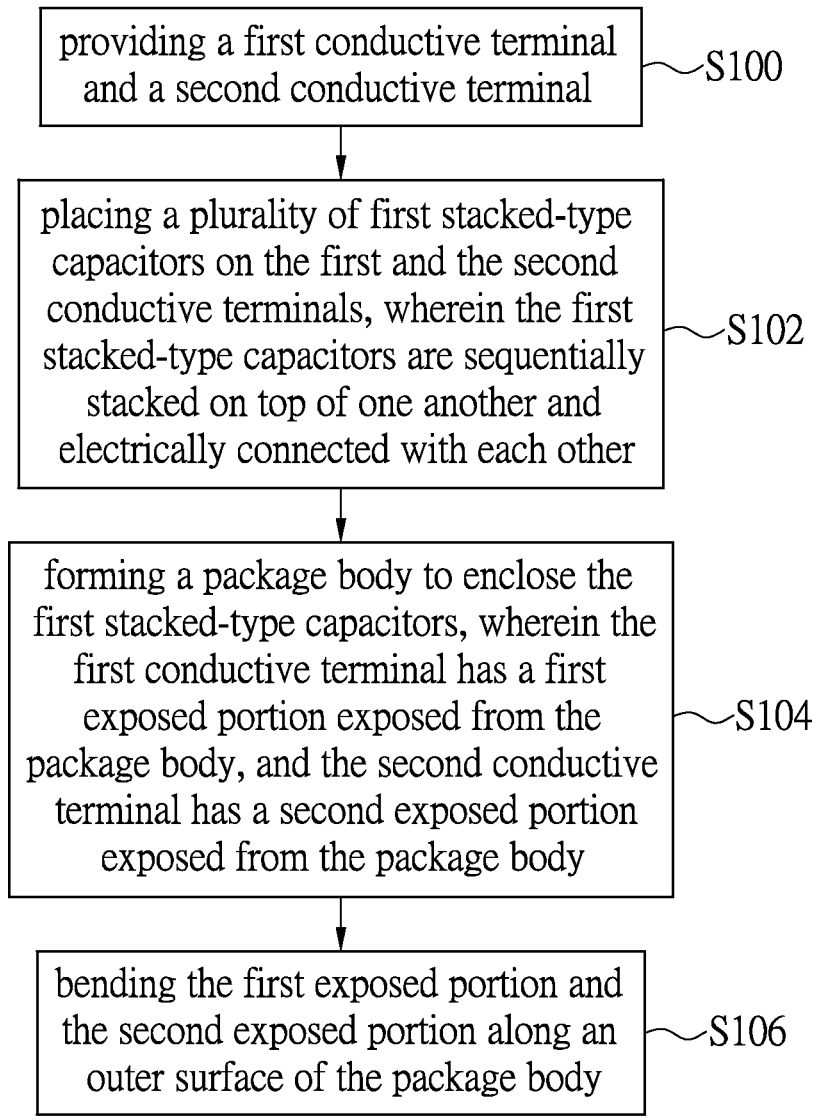
FIG. 7 shows a flowchart of the method of manufacturing the solid electrolytic capacitor package structure according to the first embodiment of the instant disclosure.

Moreover, referring to FIG. 3, FIG. 4 and FIG. 6, the at least one second conductive terminal 32 includes a second core layer 32A and a second enclosing layer 32B for enclosing the second core layer 32A, and the second core layer 32A has a second exposed top surface 321A exposed from the second enclosing layer 32B and a second exposed bottom surface 322A exposed from the second enclosing layer 32B. In addition, the second exposed top surface 321A has a second top covering area 3211 covered with the package body 20 and a second top exposed area 3212 connected to the second top covering area 3211 and exposed from the package body 20, and the second exposed bottom surface 322A has a second bottom covering area 3221 covered with the package body 20 and a second bottom exposed area 3222 connected to the second bottom covering area 3221 and exposed from the package body 20. More precisely, the second top exposed area 3212 of the second exposed top surface 321A and the second bottom exposed area 3222 of the second exposed bottom surface 322A are connected with the second lateral surface 202 of the package body 20. The second core layer 32A has a second through hole 323A passing through the second core layer 32A and connected to the second exposed top surface 321A and the second exposed bottom surface 322A, and the second through hole 323A has a second filling portion 3231 filled with the package body 20 and a second unoccupied portion 3232 connected with the second filling portion 3231 and exposed from the package body 20. Of course, not only the top and the bottom surfaces (i.e., the second exposed top surface 321A and the second exposed bottom surface 322A) of the second core layer 32A can be exposed from the second enclosing layer 32B, but also two opposite lateral surfaces of the second core layer 32A can be exposed from the second enclosing layer 32B.

For example, the second core layer 32A may be made of Cu (copper) or Cu alloy, the second enclosing layer 32B includes a second connection layer 321B made of Ni (nickel) and a second soldering layer 322B made of Sn (stannum) for enclosing the second connection layer 321B. In addition, the second core layer 32A using Cu or Cu alloy can be exposed from the second enclosing layer 32B by laser engraving, etching, sandblasting or polishing, etc., and the second top covering area 3211 and the second bottom covering area 3221 exposed from the second enclosing layer 32B can be extended from the second through hole 323A toward the first conductive terminal 31 by a predetermined distance, but the predetermined distance is merely an example and is not meant to limit the instant disclosure. Because the melting point of Cu or Cu alloy is more than that of Sn, the sealing property between the second core layer 32A of the second conductive terminal 32 and the package body 20 can be increased. It's worth mentioning that one portion of the second enclosing layer 32B is moved by laser engraving, etching, sandblasting or polishing, etc. to form rough surfaces, thus the attachment property between the second conductive terminal 32 and the package body 20 can be increased. In addition, the thickness of the oxide layer generated on surfaces of Cu or Cu alloy can be decreased by adding inert gas during moving one portion of the second enclosing layer 32B, thus the attachment property between the second conductive terminal 32 and the package body 20 can also be increased.

In addition, referring to FIG. 1 to FIG. 7, the first embodiment of the instant disclosure provides a method of manufacturing a solid electrolytic capacitor package structure Z, comprising: referring to FIG. 1 and FIG. 2, providing at least one first conductive terminal 31 and at least one second conductive terminal 32 (S100); next, referring to FIG. 1 to FIG. 3, placing a plurality of first stacked-type capacitors 10 on the top side of the at least one first conductive terminal 31 and the top side of the at least one second conductive terminal 32, wherein the first stacked-type capacitors 10 are sequentially stacked on top of one another and electrically connected with each other, and each first stacked-type capacitor 10 has a first positive electrode portion P and a first negative electrode portion N (S102); then, forming a package body 20 to enclose the first stacked-type capacitors 10, wherein the at least one first conductive terminal 31 has a first embedded portion 310 electrically connected to the first positive electrode portion P of the first stacked-type capacitor 10 and enclosed by the package body 20 and a first exposed portion 311 connected with the first embedded portion 310 and exposed from the package body 20, and the at least one second conductive terminal 32 has a second embedded portion 320 electrically connected to the first negative electrode portion N of the first stacked-type capacitor 10 and enclosed by the package body 20 and a second exposed portion 321 connected with the second embedded portion 320 and exposed from the package body 20 (S104); finally, referring to FIG. 3 and FIG. 4, bending the first exposed portion 311 and the second exposed portion 321 along an outer surface of the package body 20 (S106).

More precisely, referring to FIG. 4 and FIG. 5, the at least one first conductive terminal 31 includes a first core layer 31A and a first enclosing layer 31B for enclosing the first core layer 31A, and the first core layer 31A has a first exposed top surface 311A exposed from the first enclosing layer 31B and a first exposed bottom surface 312A exposed from the first enclosing layer 31B. In addition, the first exposed top surface 311A has a first top covering area 3111 covered with the package body 20 and a first top exposed area 3112 connected to the first top covering area 3111 and exposed from the package body 20, and the first exposed bottom surface 312A has a first bottom covering area 3121 covered with the package body 20 and a first bottom exposed area 3122 connected to the first bottom covering area 3121 and exposed from the package body 20.

More precisely, referring to FIG. 4 and FIG. 6, the at least one second conductive terminal 32 includes a second core layer 32A and a second enclosing layer 32B for enclosing the second core layer 32A, and the second core layer 32A has a second exposed top surface 321A exposed from the second enclosing layer 32B and a second exposed bottom surface 322A exposed from the second enclosing layer 32B. In addition, the second exposed top surface 321A has a second top covering area 3211 covered with the package body 20 and a second top exposed area 3212 connected to the second top covering area 3211 and exposed from the package body 20, and the second exposed bottom surface 322A has a second bottom covering area 3221 covered with the package body 20 and a second bottom exposed area 3222 connected to the second bottom covering area 3221 and exposed from the package body 20.

Second Embodiment

Figure 8:
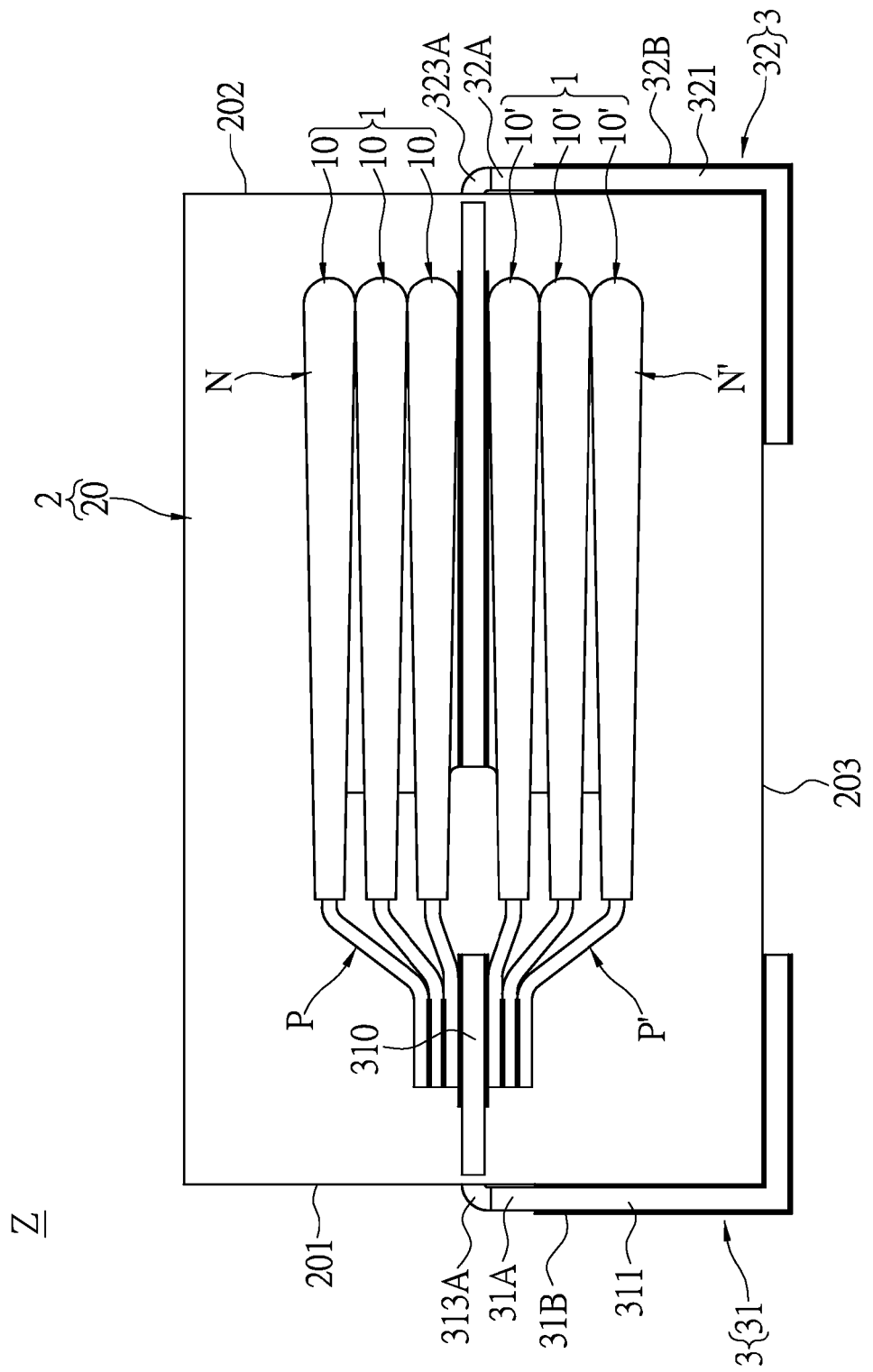
FIG. 8 shows a lateral, schematic view of the solid electrolytic capacitor package structure according to the second embodiment of the instant disclosure.

Referring to FIG. 8, the second embodiment of the instant disclosure provides a solid electrolytic capacitor package structure Z, comprising: a capacitor unit 1, a package unit 2 and a conductive unit 3. Comparing FIG. 8 with FIG. 4, the difference between the second embodiment and the first embodiment is as follows: in the second embodiment, the capacitor unit 1 includes a plurality of second stacked-type capacitors 10' sequentially stacked on top of one another and electrically connected with each other. In addition, the second stacked-type capacitors 10' are disposed on the bottom side of the at least one first conductive terminal 31 and the bottom side of the at least one second conductive terminal 32, and each second stacked-type capacitor 10' has a second positive electrode portion P' electrically connected to the at least one first conductive terminal 31 and a second negative electrode portion N' electrically connected to the at least one second conductive terminal 32.

Therefore, the first core layer 31A has a first exposed top surface 311A exposed from the first enclosing layer 31B and a first exposed bottom surface 312A exposed from the first enclosing layer 31B, and the second core layer 32A has a second exposed top surface 321A exposed from the second enclosing layer 32B and a second exposed bottom surface 322A exposed from the second enclosing layer 32B, thus the sealing property between the first conductive terminal 31 and the package body 20 and the sealing property between the second conductive terminal 32 and the package body 20 are increased. For example, when the prior capacitor package structure without increasing the sealing property and the present capacitor package structure Z with good sealing property is disposed inside the steam boiler under the temperature of 93° and the relative humidity of 100% for 8 hours, the following table shows 15 samplings to compare the prior capacitor package structure with the present capacitor package structure Z. The difference between the prior capacitor package structure and the present capacitor package structure Z is as follows:

| Sampling Number | Capacitance (μF) of the prior art | | | Capacitance (μF) of the instant disclosure | | |
| --- | --- | --- | --- | --- | --- | --- |
| | After reflow | After steam aging | Increment rate (%) | After reflow | After steam aging | Increment rate (%) |
| No. 1 | 177.7 | 247.1 | 39.10% | 251.8 | 268.6 | 6.67% |
| No. 2 | 177.6 | 247.6 | 39.40% | 251.7 | 267.8 | 6.40% |
| No. 3 | 176.4 | 228.2 | 29.40% | 250.1 | 267.8 | 7.08% |

-continued

|  | Capacitance (μF) of the prior art | | | Capacitance (μF) of the instant disclosure | | |
| --- | --- | --- | --- | --- | --- | --- |
| Sampling Number | After reflow | After steam aging | Increment rate (%) | After reflow | After steam aging | Increment rate (%) |
| No. 4 | 176.4 | 220.6 | 25.10% | 250.1 | 267.5 | 6.96% |
| No. 5 | 177.8 | 219.2 | 23.30% | 250.1 | 266.6 | 6.60% |
| No. 6 | 176.3 | 219.2 | 24.30% | 250.6 | 269.4 | 7.50% |
| No. 7 | 177.3 | 227.3 | 28.20% | 249.8 | 266.8 | 6.81% |
| No. 8 | 177.2 | 236.0 | 33.20% | 248.9 | 267.1 | 7.31% |
| No. 9 | 177.0 | 226.7 | 28.10% | 252.4 | 272.5 | 7.96% |
| No. 10 | 177.6 | 225.4 | 26.90% | 250 | 270.2 | 8.08% |
| No. 11 | 176.6 | 219.5 | 24.30% | 250.6 | 268.7 | 7.22% |
| No. 12 | 177.6 | 226.8 | 27.70% | 248.1 | 267.2 | 7.70% |
| No. 13 | 177.8 | 218.0 | 22.60% | 248.8 | 267.7 | 7.60% |
| No. 14 | 175.9 | 219.2 | 24.60% | 248.6 | 267 | 7.40% |
| No. 15 | 183.8 | 222.8 | 21.20% | 250.4 | 268.7 | 7.31% |
| MAX. | 183.8 | 247.6 | 39.40% | 252.4 | 272.5 | 8.08% |
| MIN. | 175.9 | 218.0 | 21.20% | 248.1 | 266.6 | 6.40% |
| Average | 177.5 | 226.9 | 27.80% | 250.1 | 268.2 | 7.24% |
| STDEV | 1.8 | 9.6 | 5.50% | 1.2 | 1.6 | 0.49% |

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A solid electrolytic capacitor package structure, comprising:
   a capacitor unit including a plurality of first stacked-type capacitors sequentially stacked on top of one another and electrically connected with each other, wherein each first stacked-type capacitor has a first positive electrode portion and a first negative electrode portion;
   a package unit including a package body for enclosing the capacitor unit; and
   a conductive unit including at least one first conductive terminal and at least one second conductive terminal separated from the at least one first conductive terminal by a predetermined distance, wherein the first stacked-type capacitors are disposed on the top side of the at least one first conductive terminal and the top side of the at least one second conductive terminal, the at least one first conductive terminal has a first embedded portion electrically connected to the first positive electrode portion of the first stacked-type capacitor and enclosed by the package body and a first exposed portion connected with the first embedded portion and exposed from the package body, and the second conductive terminal has a second embedded portion electrically connected to the first negative electrode portion of the first stacked-type capacitor and enclosed by the package body and a second exposed portion connected with the second embedded portion and exposed from the package body;
   wherein the at least one first conductive terminal includes a first core layer and a first enclosing layer for enclosing the first core layer, the first core layer has a first exposed top surface exposed from the first enclosing layer and a first exposed bottom surface exposed from the first enclosing layer, the first exposed top surface has a first top covering area covered with the package body and a first top exposed area connected to the first top covering area and exposed from the package body, and the first exposed bottom surface has a first bottom covering area covered with the package body and a first bottom exposed area connected to the first bottom covering area and exposed from the package body;
   wherein the at least one second conductive terminal includes a second core layer and a second enclosing layer for enclosing the second core layer, the second core layer has a second exposed top surface exposed from the second enclosing layer and a second exposed bottom surface exposed from the second enclosing layer, the second exposed top surface has a second top covering area covered with the package body and a second top exposed area connected to the second top covering area and exposed from the package body, and the second exposed bottom surface has a second bottom covering area covered with the package body and a second bottom exposed area connected to the second bottom covering area and exposed from the package body.

2. The solid electrolytic capacitor package structure of claim 1, wherein the capacitor unit includes a plurality of second stacked-type capacitors sequentially stacked on top of one another and electrically connected with each other, the second stacked-type capacitors are disposed on the bottom side of the at least one first conductive terminal and the bottom side of the at least one second conductive terminal, and each second stacked-type capacitor has a second positive electrode portion electrically connected to the at least one first conductive terminal and a second negative electrode portion electrically connected to the at least one second conductive terminal, wherein the first core layer is made of Cu or Cu alloy, the first enclosing layer includes a first connection layer made of Ni and a first soldering layer made of Sn for enclosing the first connection layer, and the second core layer is made of Cu or Cu alloy, the second enclosing layer includes a second connection layer made of Ni and a second soldering layer made of Sn for enclosing the second connection layer.

3. The solid electrolytic capacitor package structure of claim 1, wherein the package body has a first lateral surface, a second lateral surface opposite to the first lateral surface, and a bottom surface connected between the first lateral surface and the second lateral surface, the first top exposed area of the first exposed top surface and the first bottom exposed area of the first exposed bottom surface are connected with the first lateral surface of the package body, and the second top exposed area of the second exposed top surface and the second bottom exposed area of the second exposed bottom surface are connected with the second lateral surface of the package body, wherein the first exposed portion of the at least one first conductive terminal is extended along the first lateral surface and the bottom surface of the package body, and the second exposed portion of the at least one second conductive terminal is extended along the second lateral surface and the bottom surface of the package body.

4. The solid electrolytic capacitor package structure of claim 1, wherein the first core layer has a first through hole passing through the first core layer and connected to the first exposed top surface and the first exposed bottom surface, and the second core layer has a second through hole passing through the second core layer and connected to the second exposed top surface and the second exposed bottom surface, wherein the first through hole has a first filling portion filled with the package body and a first unoccupied portion connected with the first filling portion and exposed from the package body, and the second through hole has a second filling portion filled with the package body and a second unoccupied portion connected with the second filling portion and exposed from the package body.

5. The solid electrolytic capacitor package structure of claim 1, wherein each first stacked-type capacitor includes a valve metal foil, an oxide insulation layer enclosing the valve metal foil, a conductive polymer layer covering one portion of the oxide insulation layer, a carbon paste layer enclosing the conductive polymer layer, and a silver paste layer enclosing the carbon paste layer, wherein each first stacked-type capacitor has a surrounding insulating layer disposed on the outer surface of the oxide insulation layer and around the outer surface of the oxide insulation layer, and the lengths of the conductive polymer layer, the carbon paste layer and the silver paste layer of each first stacked-type capacitor are limited by the corresponding surrounding insulating layer, wherein the oxide insulation layer has a surrounding region formed on the outer surface thereof, and the surrounding insulating layer of each first stacked-type capacitor is surroundingly disposed on the surrounding region of the corresponding oxide insulation layer and contacting an end of the corresponding conductive polymer layer, an end of the corresponding carbon paste layer and an end of the corresponding silver paste layer.

6. A conductive unit, comprising: at least one first conductive terminal and at least one second conductive terminal separated from the at least one first conductive terminal by a predetermined distance, wherein the at least one first conductive terminal and the at least one second conductive terminal are connected to a package body;

wherein the at least one first conductive terminal has a first embedded portion electrically connected to the first positive electrode portion of the first stacked-type capacitor and enclosed by the package body and a first exposed portion connected with the first embedded portion and exposed from the package body, and the second conductive terminal has a second embedded portion electrically connected to the first negative electrode portion of the first stacked-type capacitor and enclosed by the package body and a second exposed portion connected with the second embedded portion and exposed from the package body;

wherein the at least one first conductive terminal includes a first core layer and a first enclosing layer for enclosing the first core layer, the first core layer has a first exposed top surface exposed from the first enclosing layer and a first exposed bottom surface exposed from the first enclosing layer, the first exposed top surface has a first top covering area covered with the package body, and the first exposed bottom surface has a first bottom covering area covered with the package body;

wherein the at least one second conductive terminal includes a second core layer and a second enclosing layer for enclosing the second core layer, the second core layer has a second exposed top surface exposed from the second enclosing layer and a second exposed bottom surface exposed from the second enclosing layer, the second exposed top surface has a second top covering area covered with the package body, and the second exposed bottom surface has a second bottom covering area covered with the package body.

7. The solid electrolytic capacitor package structure of claim 6, wherein the first exposed top surface has a first top exposed area connected to the first top covering area and exposed from the package body, the first exposed bottom surface has a first bottom exposed area connected to the first bottom covering area and exposed from the package body, the second exposed top surface has a second top exposed area connected to the second top covering area and exposed from the package body, the second exposed bottom surface has a second bottom exposed area connected to the second bottom covering area and exposed from the package body, and the first top exposed area, the first bottom exposed area, the second top exposed area and the second bottom exposed area are enclosed by a Sn filling material, wherein the first core layer is made of Cu or Cu alloy, the first enclosing layer includes a first connection layer made of Ni and a first soldering layer made of Sn for enclosing the first connection layer, and the second core layer is made of Cu or Cu alloy, the second enclosing layer includes a second connection layer made of Ni and a second soldering layer made of Sn for enclosing the second connection layer.

8. The solid electrolytic capacitor package structure of claim 7, wherein the package body has a first lateral surface, a second lateral surface opposite to the first lateral surface, and a bottom surface connected between the first lateral surface and the second lateral surface, the first top exposed area of the first exposed top surface, and the first bottom exposed area of the first exposed bottom surface are connected with the first lateral surface of the package body, and the second top exposed area of the second exposed top surface and the second bottom exposed area of the second exposed bottom surface are connected with the second lateral surface of the package body, wherein the first exposed portion of the at least one first conductive terminal is extended along the first lateral surface and the bottom surface of the package body, and the second exposed portion of the at least one second conductive terminal is extended along the second lateral surface and the bottom surface of the package body.

9. The solid electrolytic capacitor package structure of claim 6, wherein the first core layer has a first through hole passing through the first core layer and connected to the first exposed top surface and the first exposed bottom surface, and the second core layer has a second through hole passing through the second core layer and connected to the second exposed top surface and the second exposed bottom surface, wherein the first through hole has a first filling portion filled with the package body and a first unoccupied portion connected with the first filling portion and exposed from the package body, and the second through hole has a second filling portion filled with the package body and a second unoccupied portion connected with the second filling portion and exposed from the package body.

10. A method of manufacturing a solid electrolytic capacitor package structure, comprising:

providing at least one first conductive terminal and at least one second conductive terminal;

placing a plurality of first stacked-type capacitors on the top side of the at least one first conductive terminal and the top side of the at least one second conductive terminal, wherein the first stacked-type capacitors are sequentially stacked on top of one another and electrically connected with each other, and each first stacked-type capacitor has a first positive electrode portion and a first negative electrode portion;

forming a package body to enclose the first stacked-type capacitors, wherein the at least one first conductive terminal has a first embedded portion electrically connected to the first positive electrode portion of the first stacked-type capacitor and enclosed by the package body and a first exposed portion connected with the first embedded portion and exposed from the package body, and the at least one second conductive terminal has a second embedded portion electrically connected to the first negative electrode portion of the first stacked-type capacitor and enclosed by the package body and a second exposed portion connected with the second embedded portion and exposed from the package body; and bending the first exposed portion and the second exposed portion along an outer surface of the package body;

wherein the at least one first conductive terminal includes a first core layer and a first enclosing layer for enclosing the first core layer, the first core layer has a first exposed top surface exposed from the first enclosing layer and a first exposed bottom surface exposed from the first enclosing layer, the first exposed top surface has a first top covering area covered with the package body, and the first exposed bottom surface has a first bottom covering area covered with the package body;

wherein the at least one second conductive terminal includes a second core layer and a second enclosing layer for enclosing the second core layer, the second core layer has a second exposed top surface exposed from the second enclosing layer and a second exposed bottom surface exposed from the second enclosing layer, the second exposed top surface has a second top covering area covered with the package body, and the second exposed bottom surface has a second bottom covering area covered with the package body.

* * * * *